Nov. 28, 1961    J. J. BRAUND    3,010,152
METHOD OF AND APPARATUS FOR MAKING GEOGRAPHICAL GLOBES
Filed April 21, 1959    6 Sheets-Sheet 1

INVENTOR.
John J. Braund
BY
B. P. Fishburne, Jr.

Nov. 28, 1961     J. J. BRAUND     3,010,152
METHOD OF AND APPARATUS FOR MAKING GEOGRAPHICAL GLOBES
Filed April 21, 1959                6 Sheets-Sheet 2

INVENTOR.
John J. Braund
BY
R. P. Fishburne, Jr.

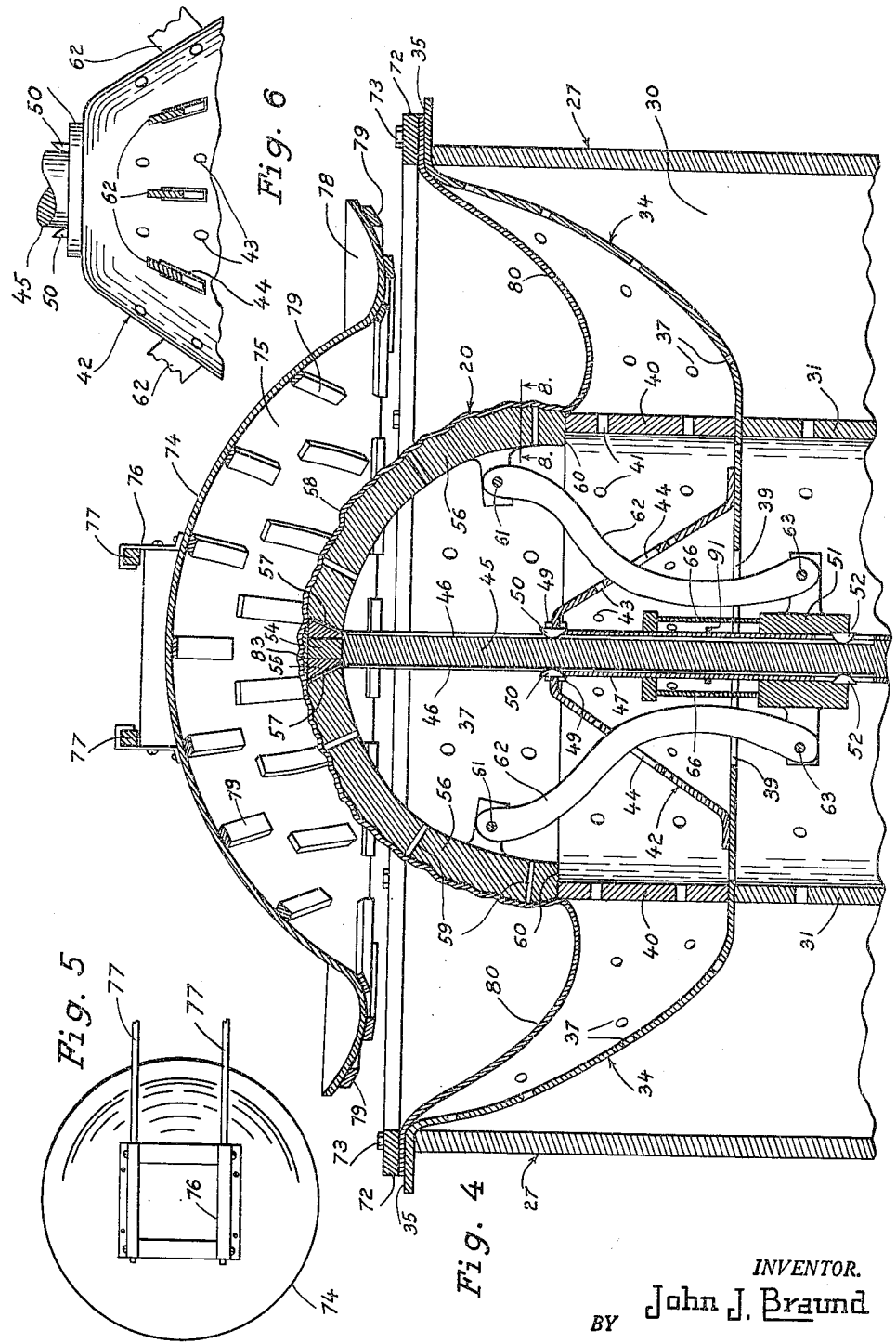

Nov. 28, 1961 J. J. BRAUND 3,010,152
METHOD OF AND APPARATUS FOR MAKING GEOGRAPHICAL GLOBES
Filed April 21, 1959 6 Sheets-Sheet 4
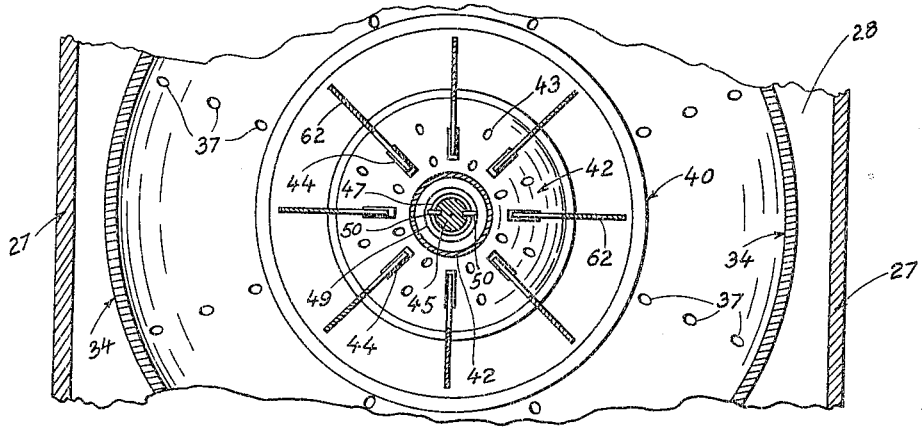
Fig. 7
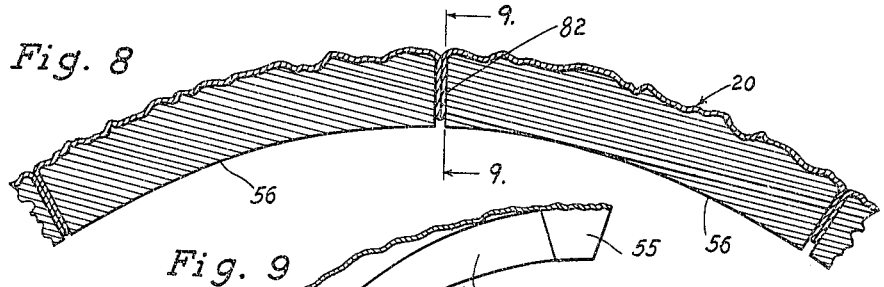
Fig. 8
Fig. 9
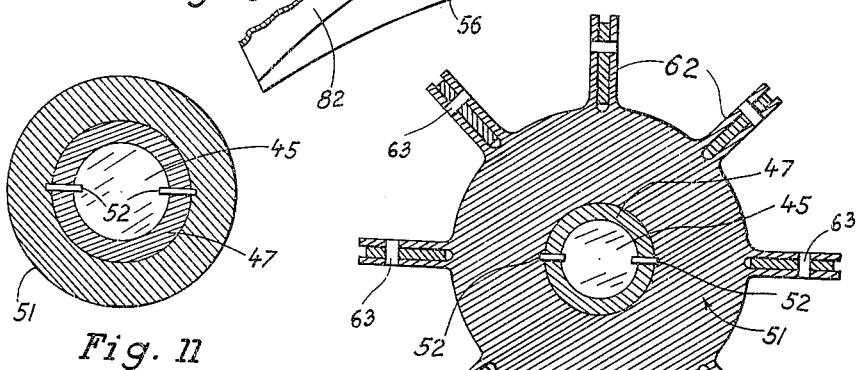
Fig. 11
Fig. 10
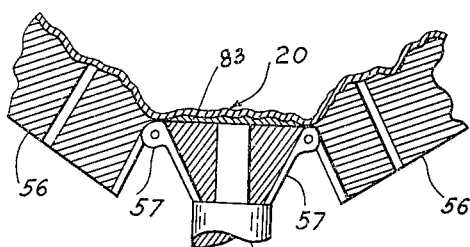
Fig. 12
INVENTOR.
BY John J. Braund

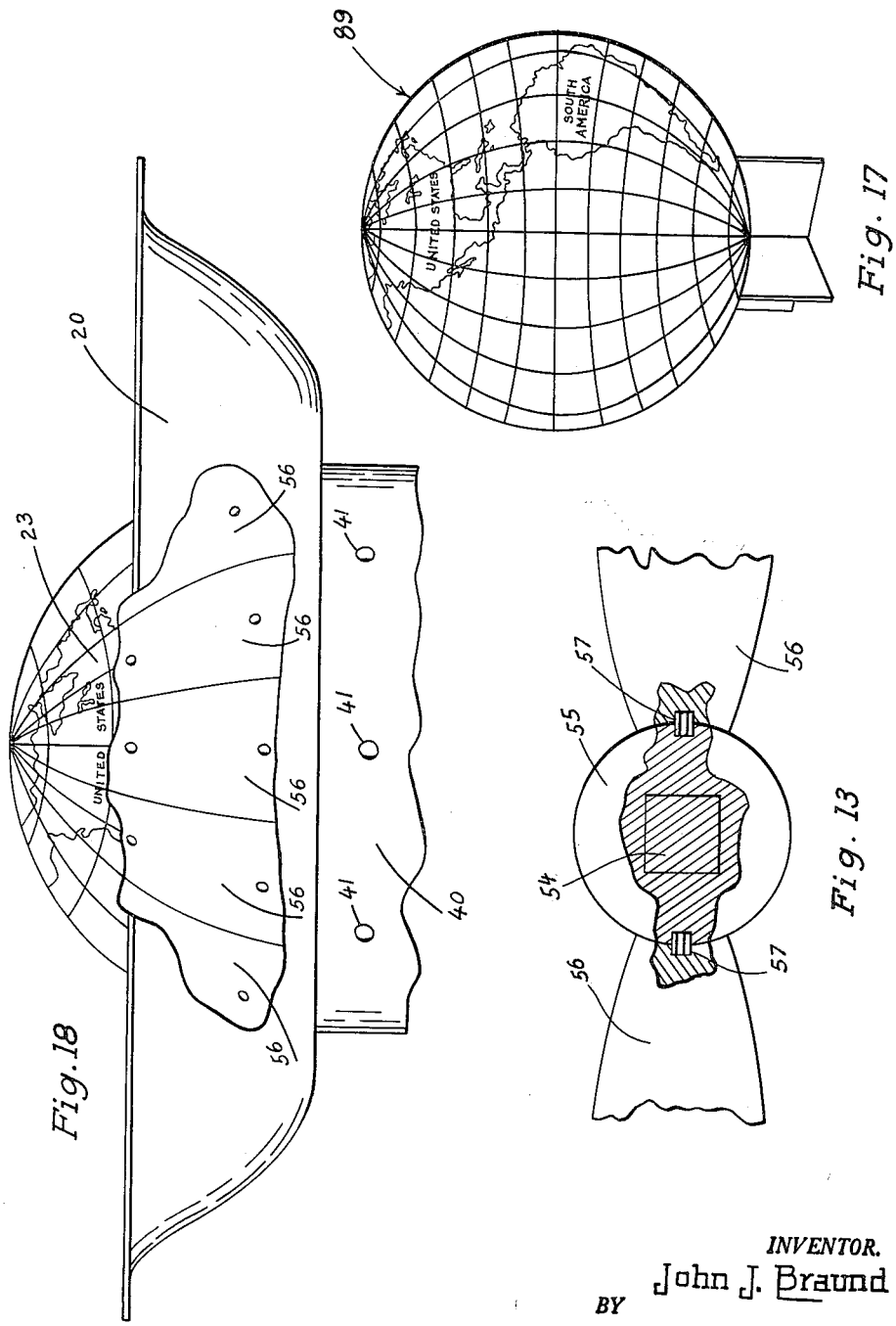

Nov. 28, 1961 J. J. BRAUND 3,010,152
METHOD OF AND APPARATUS FOR MAKING GEOGRAPHICAL GLOBES
Filed April 21, 1959 6 Sheets-Sheet 6

INVENTOR.
John J. Braund
BY
B. P. Fishburne, Jr.

United States Patent Office 3,010,152
Patented Nov. 28, 1961

3,010,152
METHOD OF AND APPARATUS FOR MAKING GEOGRAPHICAL GLOBES
John J. Braund, 900 Alabama Ave. SE., Washington, D.C.
Filed Apr. 21, 1959, Ser. No. 807,890
11 Claims. (Cl. 18—19)

This invention relates to a method of and apparatus for making hollow bodies, such as geographical globes.

An important object of the invention is to provide a method of and apparatus for making geographical globes, wherein the terrain of the earth is shown in true three-dimensional relief on the globe.

A further object of the invention is to provide a method of the above-mentioned character, wherein an initially flat sheet of thermoplastic material or the like having preprinted geographical and relief indicia is utilized in conjunction with novel molding means to provide a geographical globe in relief, and wherein the geographical and relief indicia register on the completed globe with great accuracy.

Still another object is to provide novel and simplified apparatus to be used in the practice of the method and including a unique mold structure and vacuum and heating means in conjunction therewith.

Other objects and advantages of the invention will be apparent during the course of the following description.

In the accompanying drawings forming a part of this application and in which like numerals are employed to designate like parts throughout the same, FIGURE 1 is a plan view of the apparatus employed in the practice of the method with parts omitted for simplification.

FIGURE 4 is a central vertical section through the apparatus including the heating means with the mold mechanism and associated elements in a different adjusted position.

FIGURE 5 is a plan view on a reduced scale of the heating means.

FIGURE 6 is an enlarged fragmentary side elevation of a support and guiding cone and associated elements, parts in section.

FIGURE 7 is a horizontal section taken on line 7—7 of FIGURE 3.

FIGURE 8 is an enlarged fragmentary horizontal section taken on line 8—8 of FIGURE 4.

FIGURE 9 is a fragmentary vertical section taken on line 9—9 of FIGURE 8.

FIGURE 10 is an enlarged horizontal section taken on line 10—10 of FIGURE 3, parts omitted.

FIGURE 11 is a similar section taken on line 11—11 of FIGURE 3.

FIGURE 12 is an enlarged fragmentary vertical section showing the connections between a pair of movable mold segments and the reciprocating mold plunger.

FIGURE 13 is an enlarged fragmentary view showing the hinge structure of each mold segment, parts omitted.

FIGURE 17 is a perspective view partly diagrammatic of a geographical globe made according to the method.

FIGURE 18 is a side elevation of the mold apparatus as shown in FIGURE 4 with parts omitted and parts broken away.

Figure 2:
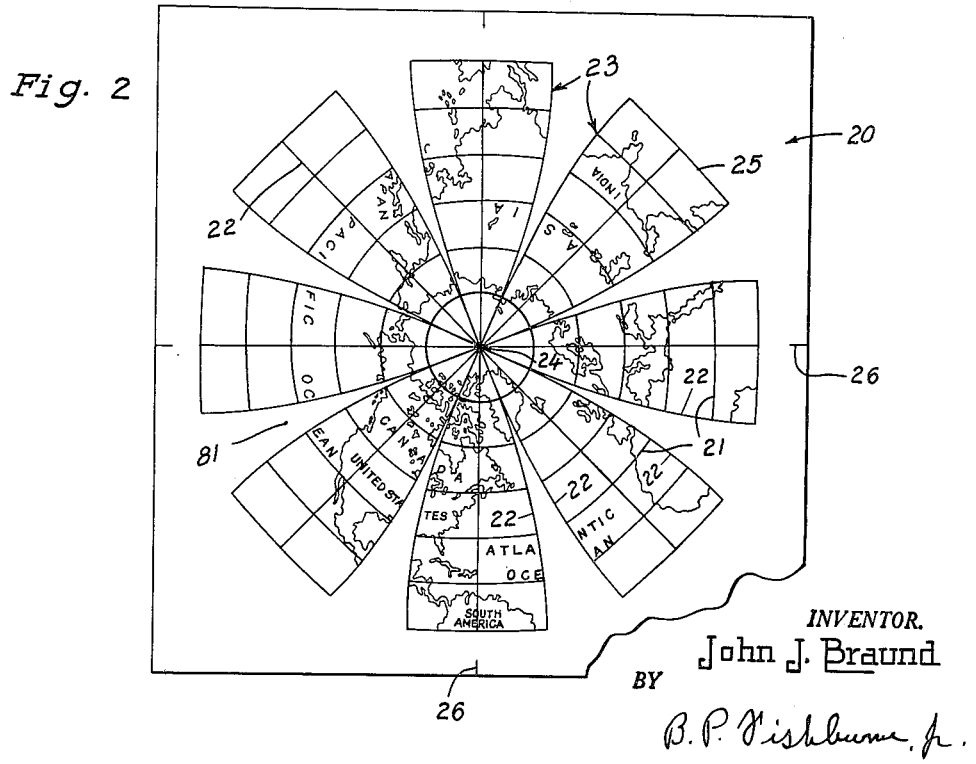
FIGURE 2 is a plan view of a preprinted flat thermoplastic sheet utilized for making one hemisphere of the globe in accordance with the method.

In the drawings, wherein for the purpose of illustration is shown a preferred embodiment of the invention, attention is directed first to FIGURE 2, wherein the numeral 20 designates an initially flat rectangular sheet of thermoplastic material such as a vinyl plastic or the like. The sheet 20 may have a thickness of about 1/64 of an inch, although this thickness may be increased or decreased somewhat as found desirable. The flat sheet 20 is preprinted by conventional means, as shown in FIGURE 2, to provide thereon the desired geographical and relief indicia for the finished hemisphere of the globe to be produced from the sheet 20. It should be understoond that a second preprinted flat sheet similar to the sheet 20 will also be utilized in the method for making the other hemisphere of the globe, and only one of the preprinted sheets is shown in the drawings for simplification.

The printed geographical and relief indicia includes the usual parallels 21 and meridians 22 as indicated in FIGURE 2, as well as the usual geographical terrain, oceans, etc. as shown. The geographical indicia on the sheet 20 is printed in segmental form on the initially flat sheet, and may include eight printed segments 23, as shown, or a greater or lesser number of segments if preferred. The printed segments 23 are spaced equidistantly circumferentially, and each segment 23 is bounded upon its opposite sides by curved meridian lines, as shown. The spaced printed indicia segments 23 taper inwardly to the pole 24 of the particular hemisphere shown in the sheet 20, and the outer extremities of the printed segments 23 terminate inwardly of the margins of the rectangular sheet 20 and are bound by lines 25 which will constitute the equator line on the finished globe or hemisphere. The preprinted thermoplastic sheet 20 is uncut and free from openings, and unitary in construction, and it contains all of the necessary printed indicia for one hemisphere of the globe to be produced therefrom. Also printed upon the sheet 20 are four accurate register marks 26, spaced exactly ninety degrees apart, and in alignment with the adjacent medidian lines 22 of the four printed segments 23 at the top and bottom and sides of the sheet 20 in FIGURE 2.

With reference to the other figures of the drawings, the apparatus used in the practice of the method comprises a preferably rectangular box 27, including side walls and a bottom wall 28, all joined in an air tight manner. Nipples 29 are mounted in the bottom wall 28 for connection with hoses, not shown, leading to a suitable suction pump, not shown, which may be arranged remote from the box 27 or beneath the bottom wall 28. The interior of the box 27, above the bottom wall 28, constitutes a suction chamber 30 as will become apparent.

Rigidly mounted upon the bottom wall 28, centrally thereof, is a large support ring 31 having a plurality of spaced side openings 32 for placing the interior of the ring 31 in communication with vacuum in the chamber 30. Resting upon the top of ring 31 and preferably rigidly secured thereto is the bottom wall 33 of a rigid upwardly opening circular bowl having a curved side wall 34 and a top marginal flange 35 integral therewith and resting upon and secured to the upper edges of the four side walls of box 27.

Figure 1:
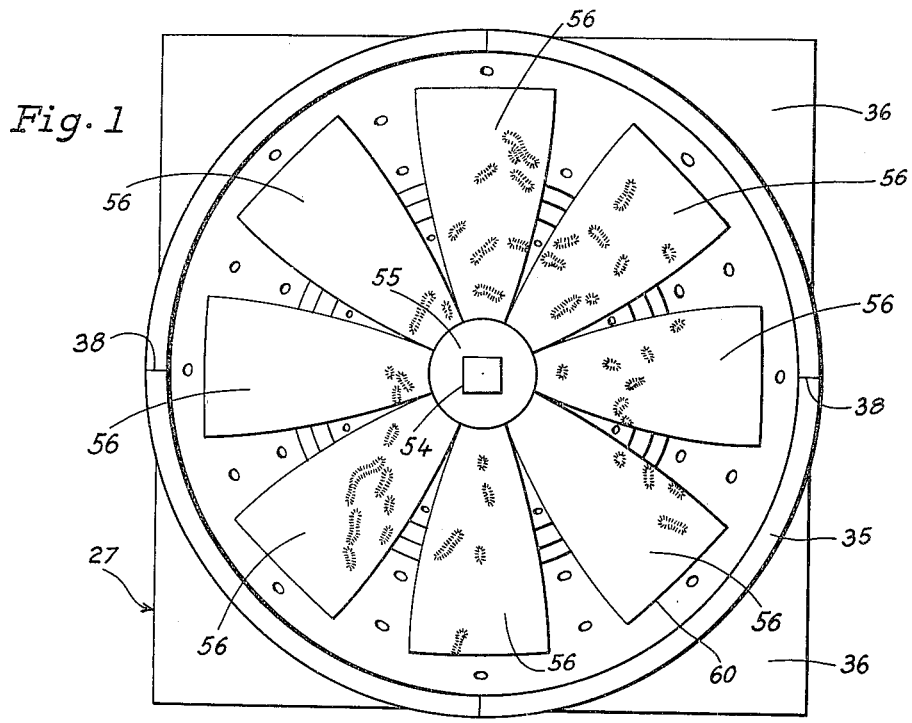

As best shown in FIGURE 1, the flange 35 being circular engages the box side walls at four narrow regions of the flange, and on opposite sides of these regions the open top of the box 27 is filled in or closed by corner top wall segments 36 having fluid tight connection with the box side walls and the flange 35 of bowl 34. The bowl 34 is provided in its side and bottom walls with a multiplicity of spaced openings 37 to place the interior of the bowl in communication with the vacuum chamber 30. The top flange 35 of the bowl is provided with four circumferentially equidistantly spaced register marks 38, for accurate registration with the register marks 26 of sheet 20. The bowl 34 is further provided in its bottom wall with a large central opening 39, as shown.

Mounted upon the bottom wall 33 of bowl 34 and rigidly secured thereto and extending thereabove for a substantial distance is an annular support or spacer ring 40, substantially identical to the ring 31, for a purpose to be described. The ring 40 is preferably provided with a plurality of small side openings 41, and the top of the ring 40 is open.

A guide and support cone 42 is mounted centrally upon the bottom wall 33 of bowl 34 and rigidly secured thereto, and the cone 42 is within the ring 40 and concentric therewith. The cone 42 also has a plurality of small openings 43 formed therethrough, and the side wall of the cone has eight circumferentially equidistantly spaced guide slots 44 formed therethrough for a purpose to be described.

The top of the guide and support cone 42 has a central opening to receive a vertical reciprocatory plunger rod or shaft 45, provided upon opposite sides with a pair of long keyways 46. The shaft 45 reciprocates within an upstanding tube 47, having its lower end secured to the bottom wall 28 at 48. The upper end of the tube 47 terminates at the top of cone 42 and is suitably rigidly secured thereto as at 49. A pair of diametrically oppositely arranged keys 50, rigid on the top of cone 42 slidably engage within the keyways 46 of shaft 45, so that this shaft is positively held against turning on its longitudinal axis while it reciprocates vertically.

A reciprocatory hub 51 is slidably mounted upon the fixed guide tube 47 and this hub is adapted to move vertically during the operation of the apparatus relative to the tube and the shaft 45. The hub 51 is positively held against turning upon the axis of the tube 47 by a pair of diametrically opposed keys 52 secured in key recesses of the hub and slidably engaging the long keyways 46 of shaft 45. The tube 47 is also slotted adjacent to the region over which the hub 51 moves, to receive the keys 52 as indicated at 53.

The upper end of shaft 45 has a reduced square extension 54 formed integral therewith, and having securely and immovably mounted thereon a downwardly tapered conical head or block 55. The head 55 has a central square opening receiving the shaft extension 54, and the head is positively held against rotation upon the shaft 45, but reciprocates vertically therewith.

Eight circumferentially equidistantly spaced mold segments 56 are provided, corresponding in number, arrangement and size to the printed segments 23 of the sheet 20. The mold segments 56 extend radially of the head 55 in surrounding relation thereto, FIGURE 1, and each mold segment has its inner end hingedly secured to the head 55 by a mortised hinge 57, arranged at the transverse center of the segment 56 at its inner end. Each hinge 57 is recessed into the head 55 and associated mold segment 56 as shown in FIGURES 12 and 13. The arrangement permits the mold segments 56 to swing vertically about their inner ends between the positions shown in FIGURES 3 and 4.

Each mold segment 56 is spherically curved and constitutes a section or segment of one hemisphere of a globular mold. Eight of the mold segments 56 are illustrated, to correspond to the eight printed segments 23 on the preprinted sheet 20, and it should be understood that any preferred number of mold segments 56 and printed segments 23 may be employed in the apparatus and method as found desirable.

As shown in the drawings, the upper surfaces of the mold segments 56 are provided with three-dimensional relief 58, corresponding to the terrain relief indicia on the preprinted sheet 20 and accurately registerable therewith during the formation or molding of the geographical globe hemisphere. Each mold segment 56 is provided with a multiplicity of spaced vent openings 59, communicating with the vacuum chamber 30 to aid in drawing the sheet 20 downwardly into intimate contact with the tops of the mold segments, as will be further described. The inner ends of the mold segments 56 are concave and beveled to fit snugly with the downwardly tapered conical head 55 when the mold segments are in their positions shown in FIGURE 4. The outer ends 60 of the mold segments 56 are flat or straight and adapted to abut the top of spacer ring 40 as indicated in FIGURE 4. The mold segments 56 are disposed within the bowl 34, centrally thereof, as shown.

Each mold segment 56 has pivoted thereto on its underside and near and inwardly of its outer end, as at 61, a curved rigid operating link 62. Each link 62 projects inwardly of the ring 40 and extends slidably through one of the guide slots 44 in stationary cone 42. The guide slots 44 coact with the links 62 and hinges 57 to eliminate all wobbling or lateral shifting of the mold segments 56, and the same are swingable vertically in true arcs upon their hinges. The lower ends of the links 62 are pivoted at 63 between pairs of apertured lugs 64 carried by the reciprocatory hub 51. It may now be seen that the links 62 interconnect the swingable mold segments 56 and the hub 51 and also serve to guide the mold segments during their vertical swinging movement through the action of the slots 44.

Figure 3:
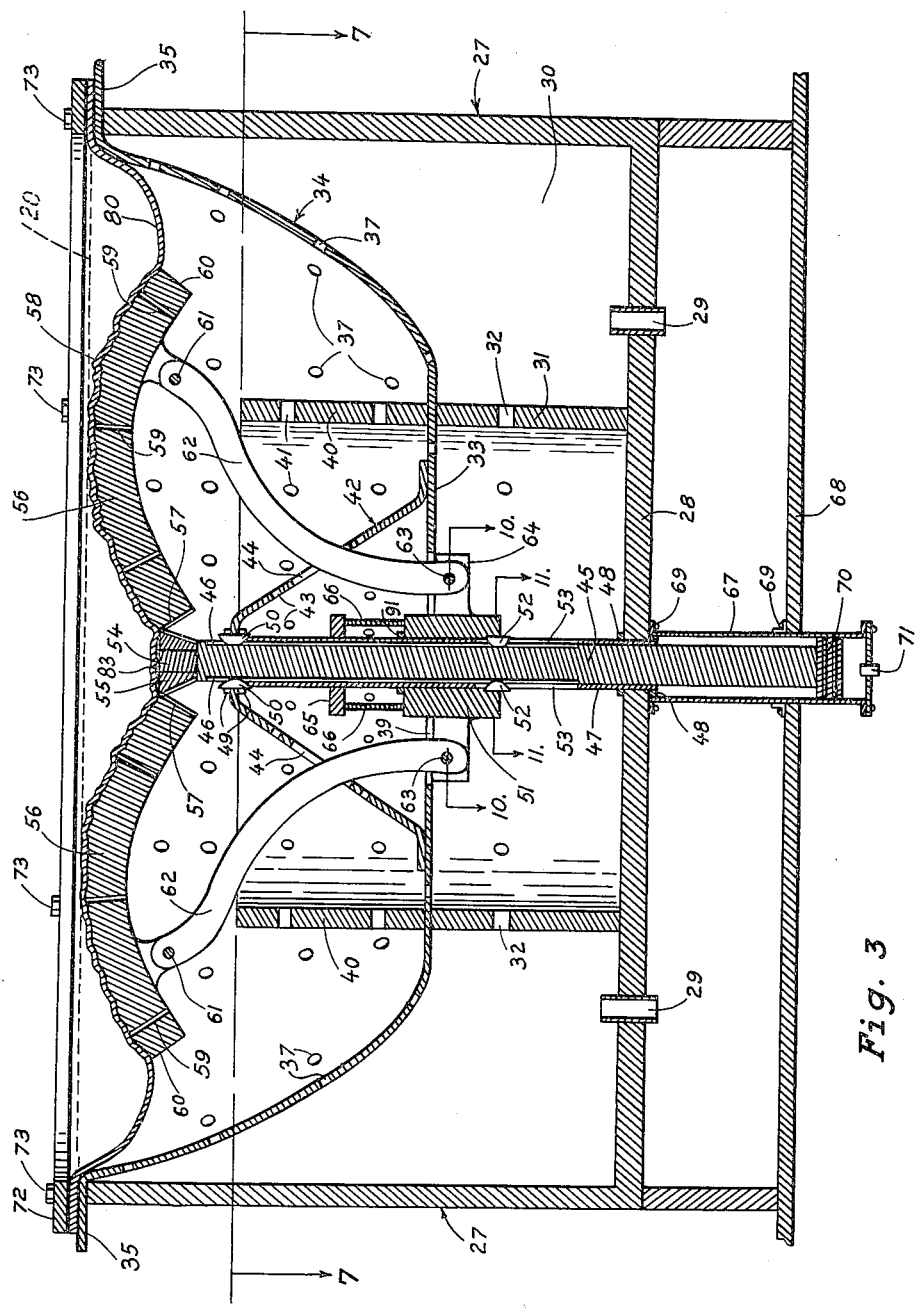
FIGURE 3 is a central vertical section through the apparatus and showing the mold mechanism and associated elements in one adjusted position, the heating means being omitted for simplification.

A collar 65 is rigidly secured to the tube 47 above the hub 51, and a plurality of retractile coil springs 66 interconnect the stationary collar 65 and hub 51 and serve to urge the hub upwardly to its position shown in FIGURE 3. A stop ring 91 rigid on the tube 47 serves as a positive stop to limit upward movement of the hub 51.

Below the bottom wall 28, a cylinder 67 for fluid under pressure is rigidly secured to the bottom wall 28 and also to an underlying base or support 68 as indicated at 69. The shaft 45 projects into the cylinder 67 and has a suitable piston 70 secured to its lower end for operating the shaft 45 vertically. Means 71 is provided upon the lower end of cylinder 67 for admitting and discharging fluid under pressure from a suitable source with controls, not shown.

A removable rigid clamping ring 72 is provided above the bowl flange 35 for tight clamping engagement with the marginal portion of the preprinted sheet 20, and bolts 73 or screws are provided for detachably securing the clamping ring 72 to the flange 35.

With reference to FIGURES 4 and 5, heating means is provided for use in conjunction with the suction mold apparatus previously described. This means comprises a spherically curved heat reflecting dome or shell 74, preferably having a polished concave face 75 to reflect heat downwardly and inwardly upon the thermoplastic sheet 20 as the same is being formed or molded. The dome 74 is carried by bracket means 76, slidably mounted on horizontal tracks 77 so that the heating means may be retracted horizontally from overlying centered relationship to the mold mechanism as shown in FIGURE 4. The heating means has been shown partly diagrammatically in the drawings for simplification, and it has been omitted from FIGURE 3 for simplification of illustration, but it should be understood that the heating means is supported above the box 27 and mold mechanism and adapted to be shifted into overlying relation thereto and to be retracted therefrom, as previously stated.

The dome 74 has a marginal reversely curved flange 78 integral therewith for a purpose to be described. A multiplicity of resistance heating elements 79 are secured to the lower face of the dome 74 and flange 78 in spaced relation, for directing heat upon the thermoplastic sheet 20 to soften it during the molding operation. The heating elements 79 are conventional in construction and have been illustrated diagrammatically in FIGURE 4. They are preferably of the type employed in electric irons, wherein resistance heating wires are sandwiched between insulating sheets of mica or the like. The heating elements 79 are spaced on the dome 74 and flange 78 to heat all areas of the sheet 20 uniformly, and in this connection, the elements 79 are more closely spaced on the flange 78 than on the body portion of the dome 74 because, as shown in FIGURE 4, a deeper drawing or sagging of the sheet 20 occurs during molding directly below the flange 78.

The use of the apparatus in the practice of the method is as follows:

The preprinted rectangular thermoplastic sheet 20 is initially placed in the flat condition upon the bowl flange 35, and the register marks 26 and 38 are accurately aligned. This positions the printed indicia segments 23 for accurate registration with the relief bearing mold segments 56, which are initially in the position shown in FIGURE 3. The clamping ring 72 is now secured in place, and the sheet 20 is clamped against the flange 35 in an air tight manner. The initial flat disposition of the sheet 20 is shown by the dotted line in FIGURE 3. The springs 66 are now holding the hub 51 elevated, and there is no pressure in the fluid cylinder 67, and the shaft 45 is in the lowermost position. The mold segments 56 are now elevated and generally horizontally disposed with their tops at the elevation of the flat sheet 20.

The heating means 75 is now shifted into overlying centered relation with the mold mechanism of FIGURE 3, and the heating elements 79 are energized and heat is directed upon the thermoplastic sheet 20. This will soon cause the sheet 20 to soften or plasticize somewhat, and the sheet will drape or sag downwardly toward contact with the elevated mold segments 56 in FIGURE 3. The printed indicia areas or segments 23 will automatically align or register with the underlying mold segments 56 due to the registration of the marks 26 and 38 on the sheet and flange 35 respectively.

A relatively low vacuum may now be created in the chamber 30 as the softening and sagging of the preprinted sheet 20 takes place, and this will begin immediately to lock the thermoplastic sheet 20 in registration with the mold segments 56, FIGURE 3. The three-dimensional relief 58 on the mold segments will now accurately register with the relief indicia of the printed areas or segments 23.

As the heating and softening of the sheet 20 continues, fluid pressure is slowly introduced into the bottom of cylinder 67, and the shaft 45 begins to move upwardly gradually toward its position of FIGURE 4. Simultaneously, the degree of vacuum in chamber 30 is gradually increased, and the sheet 20 is more strongly locked to the mold segments 56, as the latter begin to move toward their positions of FIGURE 4. The vacuum also acts strongly on the marginal areas 80 of the sheet 20, and this pulls the sheet downwardly about the margin of the mold structure and prevents the sheet from separating from the mold segments.

As the shaft 45 moves upwardly toward its position of FIGURE 4, the springs 66 yield and the hub 51 moves downwardly toward its position of FIGURE 4, to permit the mold segments 56 to swing downwardly with arms or links 62. The extent of movement of the hub 51 is much less than the vertical movement of the shaft 45, but the net result of the relative movements between the shaft 45, hub 51 and mold segments is such that the top of the shaft 45 having the head 55 is elevated a relatively slight distance in FIGURE 4 from its initial position in FIGURE 3, and the lower ends 60 of the mold segments, FIGURE 4, are moved only a relatively small amount below their initial elevations in FIGURE 3. This makes it possible to form the sheet 20 into a hemisphere without unduly stretching the sheet when the same is moving with the mold segments between its positions shown in FIGURES 3 and 4.

When the parts reach their relative positions shown in FIGURE 4, the lower ends 60 of the mold segments abut the top of the ring 40 which forms a positive stop, and maximum vacuum is now applied within the chamber 30. The heater means is now shut off and retracted from above the mold mechanism, and the molded sheet 20 is now allowed to cool and set while high vacuum is maintained in the chamber 30.

During the movement of the mold segments gradually from their positions of FIGURE 3 to their positions of FIGURE 4, the narrow areas 81 of the preprinted sheet 20 between the printed segments 23 will be drawn downwardly by vacuum between the opposed longitudinal edges of the mold segments 56 to form pleats or folds 82, FIGURES 8 and 9, which will become rigid internal ribs upon the cured or hardened globe hemisphere to be later described. By the time the mold segments 56 reach their positions of FIGURE 4, the unprinted tapered areas 81 of the sheet 20, FIGURE 2, are entirely drawn downwardly between the radial edges of the mold segments to form the pleats or ribs 82, and the preprinted segments 23 will now exactly register with the mold segments 56 which are in closed substantially contacting relation in FIGURE 4 so as to constitute a continuous hemispherical mold. The outer meridian lines 22 of the printed segments 23 will now exactly register on the hemispherical globe section and the parallels 21 of the several printed segments 23 will register, as will all of the printed geographical indicia on the sheet 20, which is now formed or molded into a hemispherical globe section.

It may be mentioned here that the top of the head 55 may also carry three-dimensional relief 83 to complete the relief molding of the hemispherical globe section at the polar region.

After the molded globe hemisphere has cooled and hardened, it is readily removable from the mold structure as shown in FIGURE 4. The vacuum in the chamber 30 may be reduced to atmospheric pressure and the clamping ring 72 removed, and the cylinder 67 may remain pressurized to hold the shaft 45 in the elevated position of FIGURE 4. The operator now releases the molded sheet 20 from the mold structure and the molded sheet will have sufficient resiliency to permit it to be readily separated from the mold. If preferred, the pressure in cylinder 67 may also be relieved when the globe hemisphere is to be removed from the mold structure.

Figure 14:
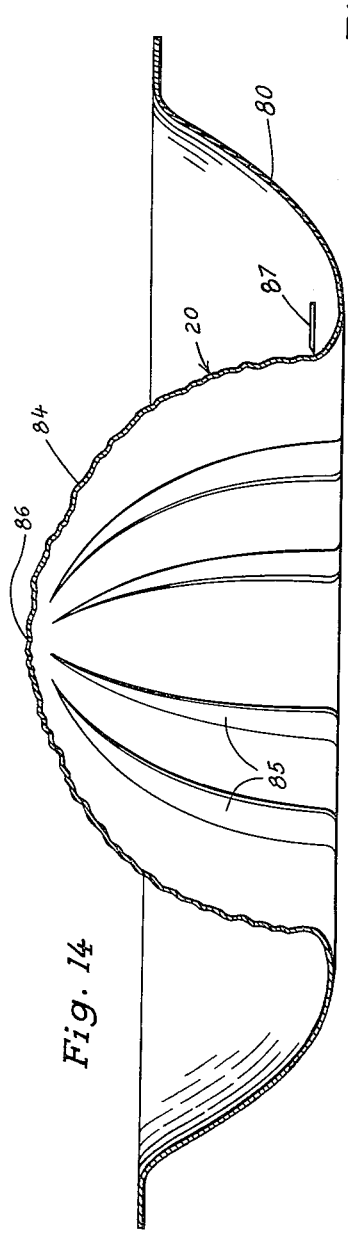
FIGURE 14 is a central vertical section, partly diagrammatic, through one completed hemisphere of the globe prior to trimming.

Once removed from the mold apparatus, the molded sheet 20 will appear as shown in FIGURE 14, and the marginal portions 80 are still connected with the molded globe hemisphere 84 having the internal equidistantly spaced stiffening ribs 85 formed by the pleating operation at 82 during the molding of the sheet as previously explained. The ribs 85 in the embodiment shown will be eight in number because there are eight of the unprinted areas 81, but the number of ribs may be varied as should be obvious. The ribs 85 will taper from the bottom open side of the globe hemisphere 84, FIGURE 14, toward the north or south pole 86, as shown.

Figure 16:
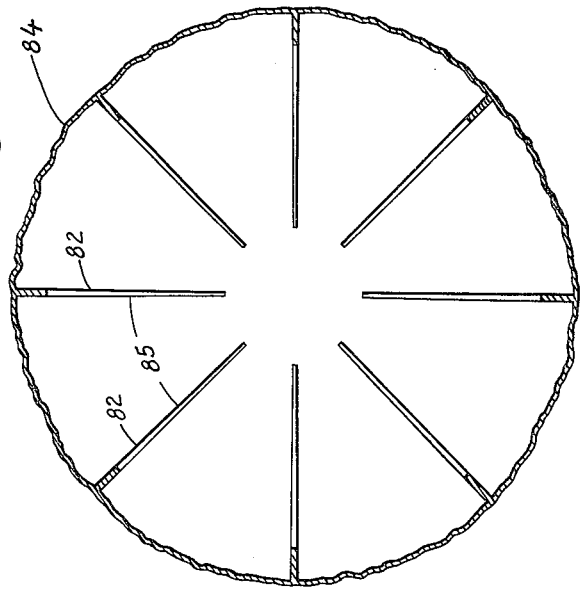
FIGURE 16 is a horizontal section taken on line 16—16 of FIGURE 15.

The molded sheet 20, FIGURE 14, is now placed over a suitable hemispherical form having slots to receive the ribs 85, and the marginal portions 80 are trimmed off by a suitable movable cutter blade 87, shown diagrammatically in FIGURE 14. FIGURE 16 shows the appearance of the ribs 85 upon the inside of the globe hemisphere 84 after the trimming operation.

Figure 15:
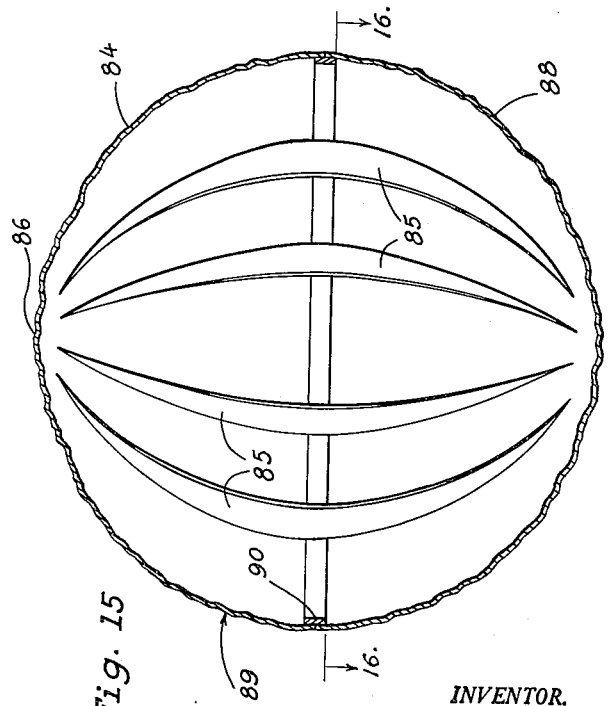
FIGURE 15 is a similar section partly diagrammatic through a completed globe including both hemispheres.

The opposite hemisphere 88 of the complete geographical globe 89, FIGURE 15, is made in the same manner above described, except that a separate preprinted sheet 20 is used, which sheet contains the proper printed geographical indicia for the second hemisphere of the globe. Likewise, a second set of mold segments 56 are employed or a second complete molding apparatus is employed if preferred, and the second mold segments 56 contain the proper three-dimensional relief for the second hemisphere 88 as should be obvious.

The two globe sections or hemispheres 84 and 88, FIGURE 15, may be joined together in any preferred manner, by gluing or the like, and securing strips 90 may be applied with cement to the inner side of the joint between the two hemispheres, as indicated.

It is thus seen that there is provided a method and apparatus for producing a geographical globe with three dimensional relief thereon from a preprinted flat thermoplastic sheet, and which sheet bears the desired printed geographical indicia including relief terrain indicia. By this method, the initially segmental printed indicia 23 is brought into perfect registration on the completed hemisphere without the necessity for cutting or slitting the sheet 20 or otherwise manipulating it except by the action of vacuum, heat and the movable mold structure. The globe produced is very light, extremely strong due to the ribs 85 and the geographical indicia and three-dimensional relief on the globe is accurate and in registration. It is entirely unnecessary, due to the use of the preprinted sheet 20 for an artist to add anything to the geographical indicia on the completed globe 89, and all coloring and other printing is taken care of when the sheet 20 is preprinted while flat.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A method of making a geographical globe from an initially flat thermoplastic sheet having preprinted geographical indicia on one side thereof, comprising supporting said sheet with its printed side uppermost and clamping the sheet near its margins, heating the sheet to partially plasticize it and applying suction beneath the sheet for causing the portion of the sheet having the printed indicia to move into contact with spherically curved segmented movable support and molding elements, shifting said elements while the sheet is contacting them to form the indicia bearing portion of the sheet into a globe hemisphere having said printed indicia in accurate registration thereon while continuing to heat the sheet and continuing to apply suction beneath it, cooling the formed sheet to harden it, and then separating the formed sheet from said elements after discontinuing said suction beneath the sheet.

2. A method of making a geographical globe from an initially flat thermoplastic sheet having preprinted geographical indicia on one side thereof, comprising clamping said sheet near its margin and outwardly of the geographical indicia to support the sheet, heating the sheet and creating a partial vacuum on one side of the sheet to draw the sheet into intimate contact with segmental globe hemisphere forming means, continuing to heat the sheet and maintaining said vacuum while operating said forming means to draw the sheet into the shape of a hollow globe hemisphere and with said indicia in accurate registration thereon, allowing the sheet to cool and harden, and then releasing the sheet and removing it from said forming means.

3. A method of making a geographical globe from an initially flat thermoplastic sheet having printed geographical indicia on segmental areas thereof and unprinted areas between said segmental areas, comprising securing the marginal portion of said flat sheet to support it, heating the sheet over the major portion of its area to partially plasticize the same, creating a partial vacuum below the sheet while continuing to heat it and thereby drawing the partially plasticized sheet downwardly, firmly supporting the printed segmental areas only of the sheet having said indicia thereon, moving the firmly supported segmental areas of the sheet to shape such areas substantially into one hemisphere of said globe with said indicia in accurate registration while maintaining said vacuum and contnuing to heat the sheet, allowing the shaped sheet to cool and harden while still maintaining said vacuum and while continuing to firmly support said areas, relieving said vacuum, and freeing the shaped sheet.

4. A method of making a geographical globe hemisphere from a unitary uncut thermoplastic sheet having printed geographical indicia thereon, said printed indicia arranged on said sheet to define circumferentially spaced segmental printed indicia areas and unprinted areas arranged between said segmental printed areas, the method comprising securing the marginal portion of said sheet outwardly of the printed indicia to initially support the sheet in a substantially flat condition, heating the thermoplastic sheet over a major portion of its area to soften it, creating a partial vacuum below the sheet while heating it to thereby cause the sheet to be drawn downwardly, firmly supporting the spaced segmental printed indicia areas of the sheet as it is drawn downwardly by said vacuum and leaving said unprinted areas between the segmental printed areas unsupported, moving the firmly supported segmental printed areas of the sheet to shape such segmental areas into a globe hemisphere while maintaining said vacuum and continuing to heat the sheet, the segmental printed areas on the globe hemisphere having their radial edges substantially in exact registration without space between said segmental areas, said unprinted areas then being drawn downwardly to form upon the inner face of the globe hemisphere a plurality of circumferentially spaced ribs adjacent to the meeting radial edges of said segmental areas, and allowing the shaped sheet to cool and harden while maintaining said vacuum.

5. A method of making a geographical globe hemisphere from a unitary thin thermoplastic sheet without cutting said sheet, the sheet being preprinted to provide thereon a plurality of circumferentially spaced radial inwardly tapering segmental printed indicia areas and unprinted radial inwardly tapering areas between the segmental printed indicia areas, the method comprising initially supporting said sheet with its printed side uppermost and clamping the sheet near its marginal edge portion and outwardly of said segmental printed areas, heating said sheet to soften it and creating a partial vacuum below the sheet while continuing to heat it to cause the sheet to sag downwardly, firmly supporting the sagging sheet under said spaced segmental printed areas only and leaving said unprinted areas unsupported and maintaining said vacuum so that said unprinted areas continue to be drawn downwardly below the supported printed areas, moving the supported segmental printed areas of the sheet to shape such areas into a globe hemisphere while maintaining said vacuum and continuing to heat the sheet and simultaneously causing said unprinted areas to form internal spaced radial ribs upon the inner face of the globe hemisphere, the segmental printed areas on the globe hemisphere having their radial edges in registration adjacent to said ribs, and then cooling said sheet while maintaining the vacuum.

6. Apparatus for making geographical globes comprising a vacuum box having a vacuum chamber, supporting means mounted upon the vacuum box and having a marginal clamping part, a detachable clamping element separable from the clamping part and operable to secure the marginal portion of a preprinted thermoplastic sheet against the clamping part with said sheet covering the top of the vacuum box, heating means mounted above the vacuum box and sheet and operable to partially plasticize said sheet, spherically curved segmental mold means arranged beneath the sheet within the vacuum box and connected with the supporting means and adapted to receive the preprinted sheet when the latter sags downwardly due to being heated and due to a partial vacuum in said vacuum chamber below said sheet, and means to move the segmental mold means from a first position supporting said sheet to a second position with said sheet and thereby forming the sheet into a globe hemisphere.

7. Apparatus for making geographical globes comprising means forming a vacuum chamber, a reciprocatory member connected with said means, a plurality of spherically curved segmental mold sections movably secured to said member and being shiftable to substantially contacting globe hemisphere forming positions, means associated with said means for supporting a thermoplastic sheet adjacent to corresponding sides of the segmental mold sections, means to heat the thermoplastic sheet, means to create a partial vacuum in said chamber, and means to reciprocate said member.

8. Apparatus for making a geographical globe with three dimensional terrain relief characteristics, comprising vacuum chamber forming means, a reciprocatory member connected with said means, means to raise and lower said member, a plurality of circumferentially equidistantly spaced globe hemisphere forming mold segments having their inner ends hingedly secured to said member and provided upon their top convex faces with three dimensional relief representative of the geographical terrain on said globe hemisphere, linkage means connected with said mold segments for causing the latter to move toward globe hemisphere forming positions when said member is elevated and to cause separation of said segments when the member is lowered, means to clamp a preprinted thermoplastic sheet to said vacuum chamber forming means above said mold segments in accurate registration with the latter, said preprinted sheet having printed segmental geographical indicia areas overlying and adapted to register with said mold segments, means to heat said sheet over a major portion of its area, and means for evacuating said chamber forming means below said sheet and mold segments.

9. Apparatus for making a geographical globe hemisphere with three dimensional terrain relief characteristics comprising means to clamp a preprinted thermoplastic sheet near the marginal edges of said sheet to initially support the sheet while the sheet is substantially flat, said preprinted sheet having a plurality of circumferentially spaced printed geographical indicia areas and unprinted areas between the printed areas, means arranged above the sheet to heat the sheet over a major portion of its area, means to create a partial vacuum below the sheet while the same is clamped and heated to thereby cause the sheet to sag, a plurality of movable segmental globe hemisphere forming mold sections arranged below said sheet to engage and support said printed indicia areas of the sheet when the sheet sags, said mold sections having three dimensional relief on their top faces for imparting terrain relief characteristics to said printed indicia areas, and means to move said mold sections for causing them to form the sheet into a globe hemisphere with the printed indicia areas of the sheet in exact registration on the globe hemisphere, said globe hemisphere having continuous printed geographical indicia thereon, said indicia having three dimensional terrain relief characteristics.

10. A method of making hollow bodies from initially flat thermoplastic sheets having preprinted indicia areas thereon, said method comprising securing the marginal portion of an initially flat preprinted sheet to support it, heating the sheet over a major portion of its total area to partially plasticize the sheet, creating a partial vacuum below the sheet while continuing to heat it and thereby drawing the sheet downwardly, firmly supporting the sheet at the areas thereof having the preprinted indicia thereon, moving the firmly supported areas of the sheet to shape such areas substantially spherically while maintaining the partial vacuum and continuing to heat the sheet, allowing the spherically shaped sheet to cool and harden while still maintaining said vacuum and while continuing to firmly support said areas.

11. A method of making a hollow body having three-dimensional surface relief thereon from an initially flat thermoplastic sheet, said sheet having preprinted indicia on circumferentially spaced areas thereof, said method comprising securing the marginal portion of said flat sheet to support it, heating the sheet to partially plasticize it, creating a partial vacuum below the sheet while heating it and thereby drawing the sheet downwardly, firmly supporting the preprinted areas of said sheet with generally spherically curved segmental shaping means having three-dimensional surface relief forming means, moving said firmly supported areas of the sheet to substantially spherically shape the same and to impart three-dimensional surface relief thereto while maintaining said vacuum and continuing to heat the sheet, and then allowing the sheet to cool and harden while maintaining said vacuum and continuing to firmly support said areas.

References Cited in the file of this patent
UNITED STATES PATENTS

| | | |
|---|---|---|
| 1,482,707 | Skinner | Feb. 5, 1924 |
| 2,352,225 | Riddiford | June 27, 1944 |
| 2,379,468 | Arnold | July 3, 1945 |
| 2,493,439 | Braund | Jan. 3, 1950 |
| 2,510,213 | Ekstedt et al. | June 6, 1950 |
| 2,635,358 | George | Apr. 21, 1953 |
| 2,836,852 | Butzko | June 3, 1958 |
| 2,841,823 | Hartesveldt | July 8, 1958 |
| 2,877,570 | Starworth | Mar. 17, 1959 |